March 8, 1927.

C. IHNE 1,620,209

SPRAY NOZZLE

Filed May 24, 1924

Inventor,
CHARLES IHNE.
By Sterling P. Buck,
Attorney.

Patented Mar. 8, 1927.

1,620,209

UNITED STATES PATENT OFFICE.

CHARLES IHNE, OF BALTIMORE, MARYLAND.

SPRAY NOZZLE.

Application filed May 24, 1924. Serial No. 715,744.

This invention relates to nozzles, and especially to an improved form of spray nozzle. The main object of this invention is to provide an extremely simple and comparatively inexpensive spray nozzle that entirely eliminates drops or globules of water emerging therefrom, by dividing the outflowing water into an extremely fine mist; also to effect the spreading of the water or mist over a relatively large area of surface being watered.

Figure 1:
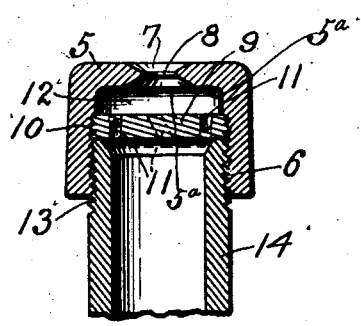
Figure 2:
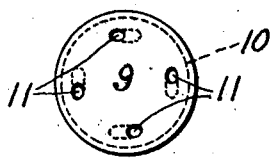

Other objects and important features will be pointed out or implied in the following details of description, in connection with the accompanying drawings in which:

Fig. 1 is a vertical sectional view of a nozzle constructed according to this invention; and Fig. 2 is a plan view of the excentrically and non-concentrically apertured disc that constitutes the inner member of the device.

Referring to these drawings in detail, in which similar reference characters correspond to the several parts in both views; the outer or upper member 5 is internally threaded at 6, and axially apertured at 7 to provide the outlet for the spray or mist; and this aperture is countersunk or counter bored at both its inner and outer ends, the counter-bores being frusto-conical and so nearly meeting one another as to provide an annular edge 8 that is quite thin or similar to a knife-edge. A substantially plane and level surface 5ª surrounds the inner one of the counter-bores and faces towards the disc which is screw-threaded at 10 and has its threads meshing with those of the part 5. This disc 9 has an imperforate center, and has a series of inclined ports or apertures 11, the inclination of each of which is approximately 60 degress to the plane surfaces of this disc and that (of the part 5) shown at 5ª. All of these apertures 11 are inclined toward one another along a circular line that passes through them. Each of them is inclined to a plane that passes therethrough and through the center of the disk. When the nozzle is in its normal upright position shown in Fig. 1, the ports are directly under the plane surface 5ª and in such relation to the latter that the water from them strikes the plane surface 5ª after passing through the clear space or centrifugal chamber 12. The centrifugal force of the water (because of the position and inclination of the ports, as described) causes the water to follow the annular wall and the surface 5ª until it is forced to concentrate and pass through the inwardly and outwardly flared opening 7 in a whirl that tends to create an air inlet at the center of the opening 7. The centrifugal effect in the chamber 12 tends to create a vacuum at the center of the chamber 12, so the air (that enters through the center to fill this vacuum) commingles with the water in the chamber 12 and at the outlet thereof, thus very finely dividing the water into a mist that is so light that it remains in the atmosphere a considerable time and is warmed and oxygenized before descending onto the grass or other vegetation being sprayed; the result being very similar to that of a mild, warm rain.

This nozzle is attachable to any form of sprayer-stand provided with suitable screw-threads as at 13, on the part 14 which is the tubular upright of an ordinary form of sprayer-stand or body. The upper end of this part 14 abuts against the disc 9 and holds it in place.

The capacity of the outlet 7 is greater than the combined capacities of the ports 11, and this feature helps to form the air-inlet at the center of the outlet 7.

It is not intended to limit this invention to the exact construction and arrangement here shown, but changes may be made within the scope of the inventive idea, as implied and claimed.

What I claim as my invention is:

The mist-forming and spraying device which includes an internally threaded part, an externally threaded disc, and an externally threaded water supply pipe or tube; the internally threaded part having a plane surface which is centrally or axially apertured, this aperture being inwardly and outwardly flared from a definite plane; said disc being in said internally threaded part and having its threads meshing with those of the latter and thereby held spaced from the said plane surface and providing a centrifugal chamber, this disc having an imperforate center and a plurality of inclined ports in position to direct water onto the said plane portion, the inclination of each port being to a plane that passes therethrough and through the center of the disc; the said supply pipe having its threads intermeshing with those of the internally threaded part and having its inner end abutting against said disc, the capacity of said central aperture being greater than the combined capacities of said inclined ports for the purpose specified.

In testimony whereof I affix my signature.

CHARLES IHNE.